United States Patent [19]
VanMetter

[11] Patent Number: 6,069,979
[45] Date of Patent: May 30, 2000

[54] METHOD FOR COMPRESSING THE DYNAMIC RANGE OF DIGITAL PROJECTION RADIOGRAPHIC IMAGES

[75] Inventor: Richard L. VanMetter, Webster, N.Y.

[73] Assignee: Eastman Kodak Company, Rochester, N.Y.

[21] Appl. No.: 08/964,168

[22] Filed: Nov. 4, 1997

Related U.S. Application Data

[63] Continuation-in-part of application No. 08/804,998, Feb. 25, 1997, Pat. No. 5,978,518.

[51] Int. Cl.[7] .................................................. G06K 9/40
[52] U.S. Cl. ......................... 382/260; 382/263; 382/264; 382/130
[58] Field of Search ..................................... 382/260, 263, 382/264, 130, 132, 254, 261, 265, 284

[56] References Cited

U.S. PATENT DOCUMENTS

| | | |
|---|---|---|
| 4,827,528 | 5/1989 | Macovski . |
| 4,941,190 | 7/1990 | Joyce . |
| 5,319,719 | 6/1994 | Nakazawa et al. ...................... 382/254 |
| 5,363,209 | 11/1994 | Eschbach et al. . |
| 5,461,655 | 10/1995 | Vuylsteke et al. . |
| 5,774,599 | 6/1998 | Muka et al. ............................. 382/254 |
| 5,805,721 | 9/1998 | Vuylsteke et al. ...................... 382/128 |

OTHER PUBLICATIONS

Sezan et al., "Automatic Anatomically Selective Image Enhancement in Digital Chest Radiography," IEEE Transactions on Medical Imaging, vol. 8, No. 2, Jun. 1989.

*Primary Examiner*—Phuoc Tran
*Attorney, Agent, or Firm*—William F. Noval

[57] ABSTRACT

A method for compressing the dynamic range of a digital radiographic image comprising the steps of: providing an original digital radiographic image; processing the original digital radiographic image with an unsharp masking technique to produce a low frequency digital radiographic image having low frequency components; subtracting the low frequency digital radiographic image from the original digital radiographic image to produce a high frequency digital radiographic image; multiplying the low frequency image by a first gain factor and the high frequency image by a second gain factor to produce respective modified low and high frequency images; combining the modified low and high frequency images with a mid-range image to produce an output digital image; and passing the output digital image through a look-up table to render an image with code values that represent optical density of a printed or displayed rendering of the image.

6 Claims, 7 Drawing Sheets

METHOD FOR COMPRESSING THE DYNAMIC RANGE OF DIGITAL PROJECTION RADIOGRAPHIC IMAGES

CROSS-REFERENCE TO RELATED APPLICATIONS

This application is a continuation-in-part application of U.S. patent application Ser. No. 08/804,998, filed Feb. 25, 1997, inventors Oliyide, VanMetter et al., now U.S. Pat. No. 5,978,518.

FIELD OF INVENTION

The present invention relates in general to image enhancement in digital image processing and in particular, to a method of image enhancement to be used in a medical radiographic imaging system, such as a computed radiography system.

BACKGROUND OF THE INVENTION

It is a common desire to enhance images acquired from imaging devices such as medical diagnostic (radiographic) imaging devices. Such enhancement may involve amplifying detail or local contrast in regions of interest, increasing or decreasing global contrast and sharpening edges. Enhancement algorithms, however, typically have the undesirable effect of enhancing and amplifying noise. It is therefore beneficial to provide a system for enhancing images while suppressing noise amplification or even reducing noise.

U.S. Pat. No. 5,461,655, by P. Vuylsteke and P. Dewaele, entitled "Method and Apparatus For Noise Reduction," describes a multiresolution noise reduction method that includes dynamic range compression. The disclosed method has the following features.

- Only noise suppression and contrast modification are addressed. There is no mention of how to increase the amplitude of detail images while suppressing noise in order to yield sharper images. It is desirable to enhance images while controlling noise.
- The multiresolution representation involves a hierarchy of difference images, where the image size decreases at coarser scales. It is desirable to minimize the cost and time involved in subsampling and interpolating.
- A means for including anatomical information in the processing is not provided, whereas it is desirable to consider anatomical information when determining the amount of enhancement to perform.
- The noise estimation involves deriving a single quantity for noise in a detail image. Because noise varies across regions of the image, and with respect to code value, it is desirable to provide more reduction which adapts to spatially or code value varying noise.
- Determining local image content is a separate step from noise estimation. It is desirable to consider local image content in the noise estimation.
- Dynamic range compression occurs in serial with noise suppression. It is desirable to modify dynamic range, enhance detail and suppressed noise in parallel, allowing for more efficient operation.

The following patents are also relevant to the present invention.

U.S. Pat. No. 5,363,209, by R. Eschbach and W. A. Fuss, titled "Image-Dependent Sharpness Enhancement".

U.S. Pat. No. 4,941,190, by T. Joyce, titled "Method and System For Enhancement of a Digitized Image".

U.S. Pat. No. 4,827,528, by A. Macovski, titled "Error-Minimizing Noise Reduction System". In the disclosed method however, the low frequency image is unmodified.

A paper titled "Automatic Anatomically Selective Image Enhancement in Digital Chest Radiography," published in IEEE Transactions on Medical Imaging, volume 8, number 2, June 1989, by Sezan, Tekalp and Schaetzing describes a method of deriving an anatomically based lookup table.

Projection radiographic images can be acquired by several methods, including computed radiography (such as the KODAK DIGITAL SCIENCE Computed Radiography System 400) and direct digital radiography (such as the TFT flat panel systems now under development). In any case, the resulting digital code-value data represents a mathematical transformation of the x-ray exposure incident upon the imaging detector (for example the logarithm of the exposure). An appropriate look-up table is needed to select a limited range of these code values into code values that can be used to generate a film image by means of a laser printer or to view the image on a display device (such as a workstation CRT). The best look-up table is often a compromise between one with adequate latitude that renders the required range of exposures and one that gives adequate contrast for visualizing features within the image.

None of the techniques disclosed in these patents provide a satisfactory solution to image enhancement in medical image processing.

SUMMARY OF THE INVENTION

According to the present invention there is provided a method of digital image enhancement, especially image enhancement of medical diagnostic (radiographic) digital images.

According to a feature of the present invention, there is provided a method for compressing the dynamic range of a digital radiographic image comprising the steps of: providing an original digital radiographic image; processing the original digital radiographic image with an unsharp masking technique to produce a low frequency digital radiographic image having low frequency components; subtracting the low frequency digital radiographic image from the original digital radiographic image to produce a high frequency digital radiographic image; multiplying the low frequency image by a first gain factor and the high frequency image by a second gain factor to produce respective modified low and high frequency images; combining the modified low and high frequency images with a mid-range image to produce an output digital image; and passing the output digital image through a look-up table to render an image with code values that represent optical density of a printed or displayed rendering of the image.

ADVANTAGEOUS EFFECT OF THE INVENTION

It is a principal object of the present invention to provide a means for enhancing an image.

DETAILED DESCRIPTION OF THE PREFERRED EMBODIMENTS

The dynamic range compression described below provides a method of maintaining adequate contrast for features within the image while increasing the latitude (range of exposures) that are rendered in the image. This avoids the expected trade-off of contrast for latitude and results in an improved image.

Unsharp masking is applied to the exposure code value image data as follows. The exposure code value data, $E(i,j)$ is convolved with a kernel whose dimension is more than 1/40th, but less than 1/10th the size of the short dimension of the image matrix. The resulting image $E_{low}(i,j)$ is an unsharp version of the original. The functional output of the dynamic range compression is given by the modified exposure code values given by:

$$E'(i,j)=\alpha \cdot E_{low}(i,j)+(1-\alpha)E_{mid}+\beta \cdot E_{high}(i,j)$$

where $$E_{high}(i,j)=E(i,j)-E_{low}(i,j),$$

$E_{mid}$ is the exposure code value corresponding to the density in the image that will remain invariant when the dynamic range compression is applied ($E_{mid}$ is image dependent), $\alpha$ is the low-frequency gain, and $\beta$ is the high-frequency gain. The expected range for $\alpha$ is greater than zero and less than one. The expected range for $\beta$ is greater than one.

The modified exposure code values are then passed through a look-up table to render code values that represent optical density of a printed or displayed rendering of the image.

Figure 1:
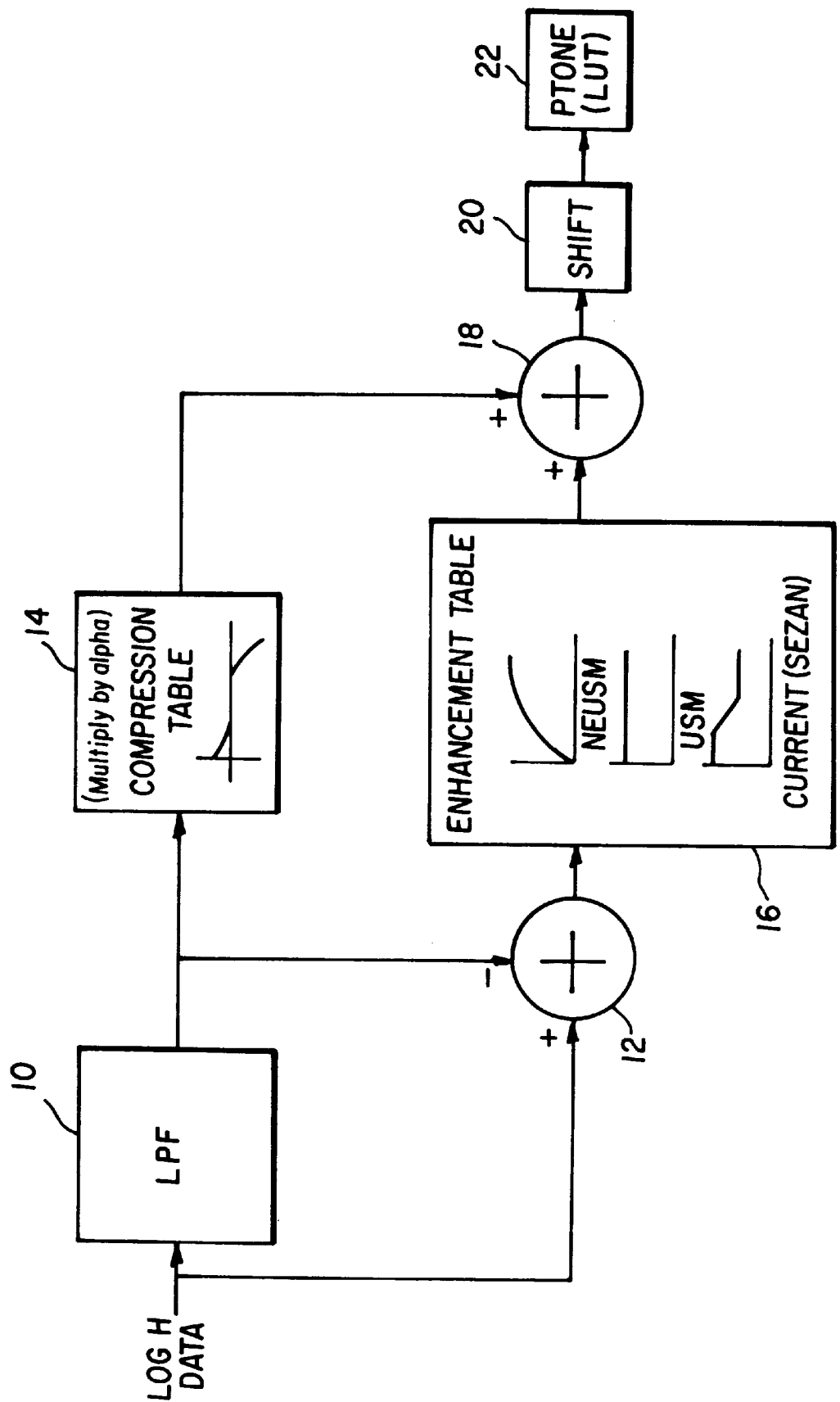
FIG. 1 is a diagrammatic view of the method of the present invention.

A digital image in which code value is linearly related to log exposure is captured with an image acquisition unit. A diagram of another enhancement technique is shown in FIG. 1. The log exposure data is then processed by the algorithm. In FIG. 1, the data is split into two frequency bands, or two resolution levels. The first resolution level is created by lowpass filtering the data by LPF 10. The second resolution level is created by subtracting the lowpass image from the original at subtractor 12, which isolates the high frequencies of the image to create a highpass image. The lowpass image is then spatially multiplied by a constant number and shifted to reflect the desired compression by circuit 14. The highpass data is processed by a set of enhancement tables in circuit 16. In FIG. 1, the top enhancement table of circuit 16 represents the output of a noise estimation algorithm. In radiography, high code values typically contain less noise than low code values, so the high code values in the present invention receive the greatest amount of amplification. The result is a greater amount of sharpening in regions that contain more exposure than regions with low amounts of exposure. The middle table represents equal amounts of sharpening in the whole image. The bottom table represents amplification of the high frequencies based on anatomical information. The processed low and high frequencies are then combined in adder 18. The resulting image is then shifted by shifter 20, for example, to match the mean of the incoming image. A lookup table 22 is then applied to the processed image to yield densities for final printing.

Figure 2:
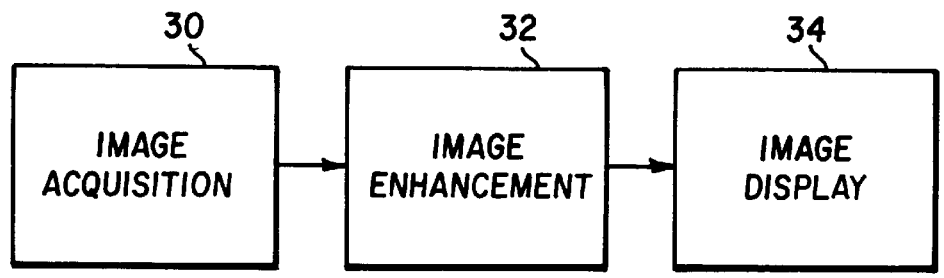
FIG. 2 is a block diagram of an imaging system incorporating the present invention.

FIG. 2 shows an example of the use of the enhancement system. An image acquired from an image acquisition unit 30 is processed by an image enhancement system incorporating the present invention, and is then displayed 32 on, for example, film or a display monitor 34.

Figure 3:
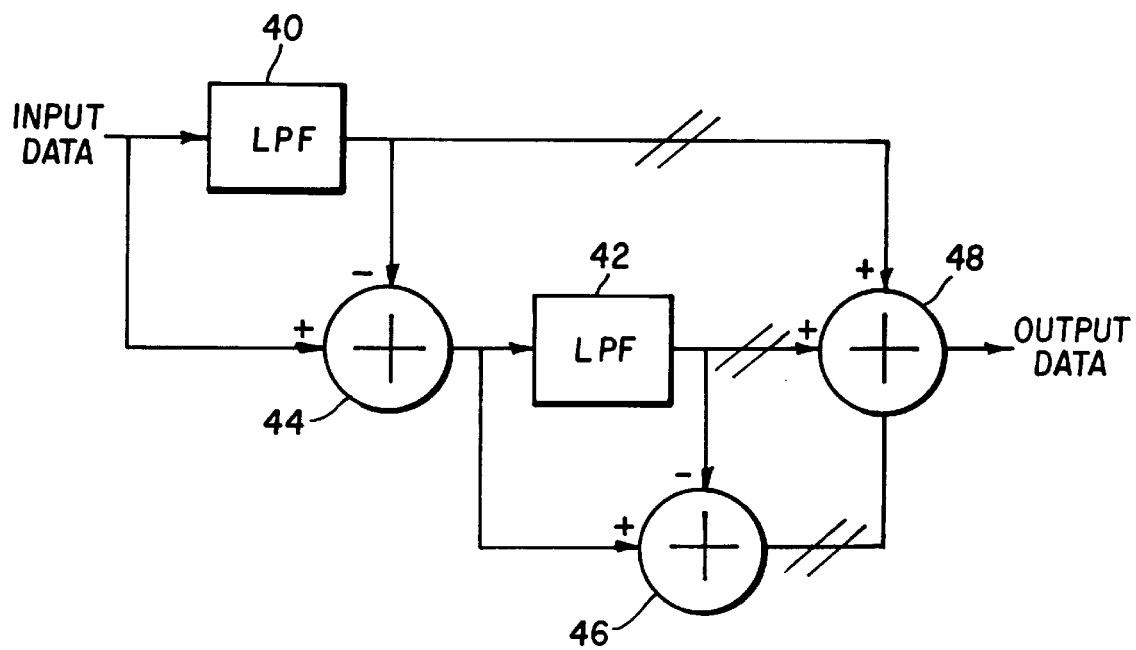
FIG. 3 is a diagrammatic view of an example of a 3 level decomposition step used in the method of the present invention.
Figure 4A:
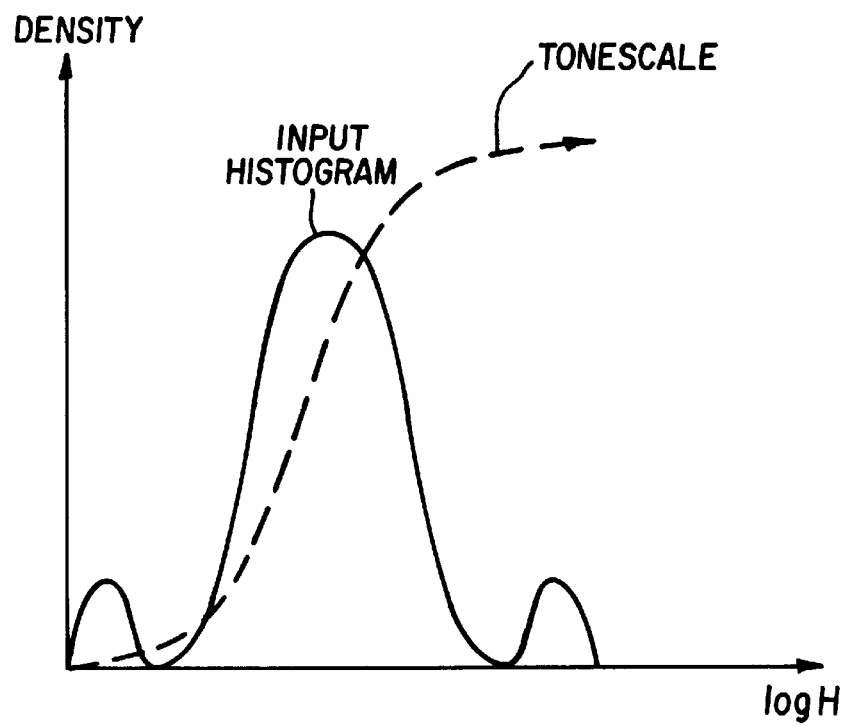
FIGS. 4a–4d are graphical views showing examples of dynamic range modification.
Figure 4B:
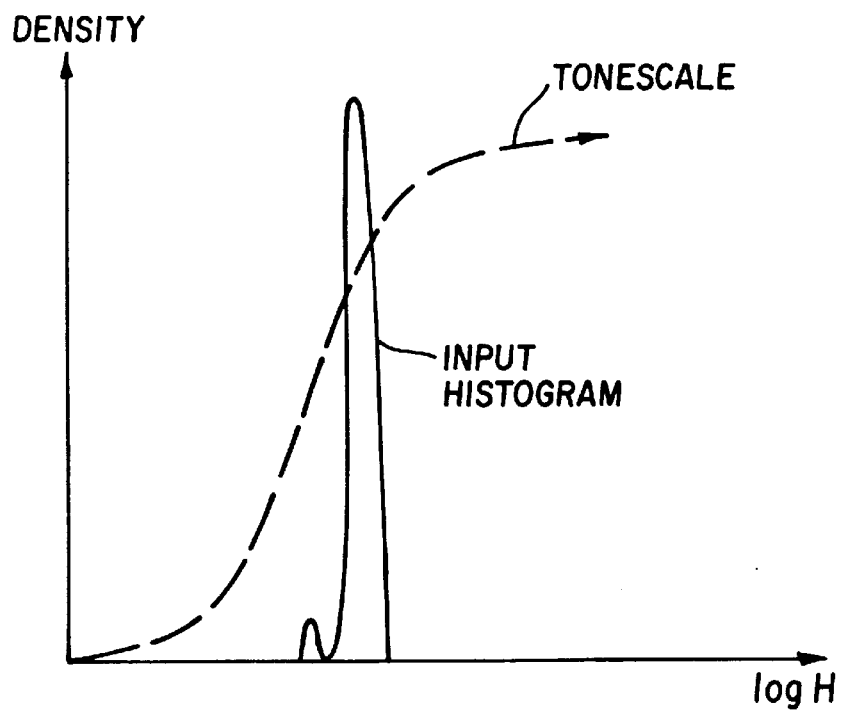
Figure 4C:
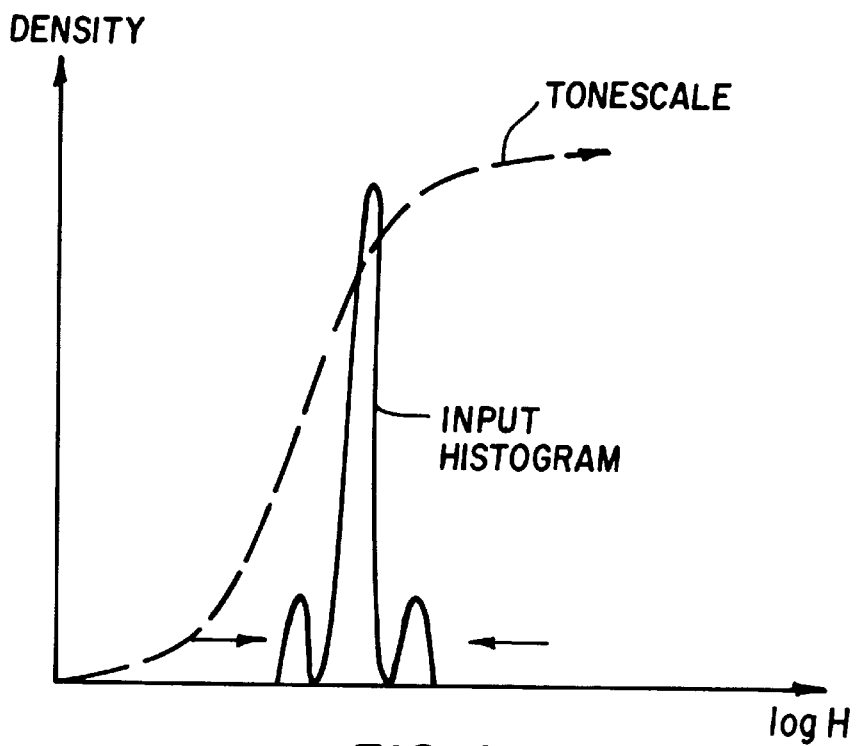
Figure 4D:
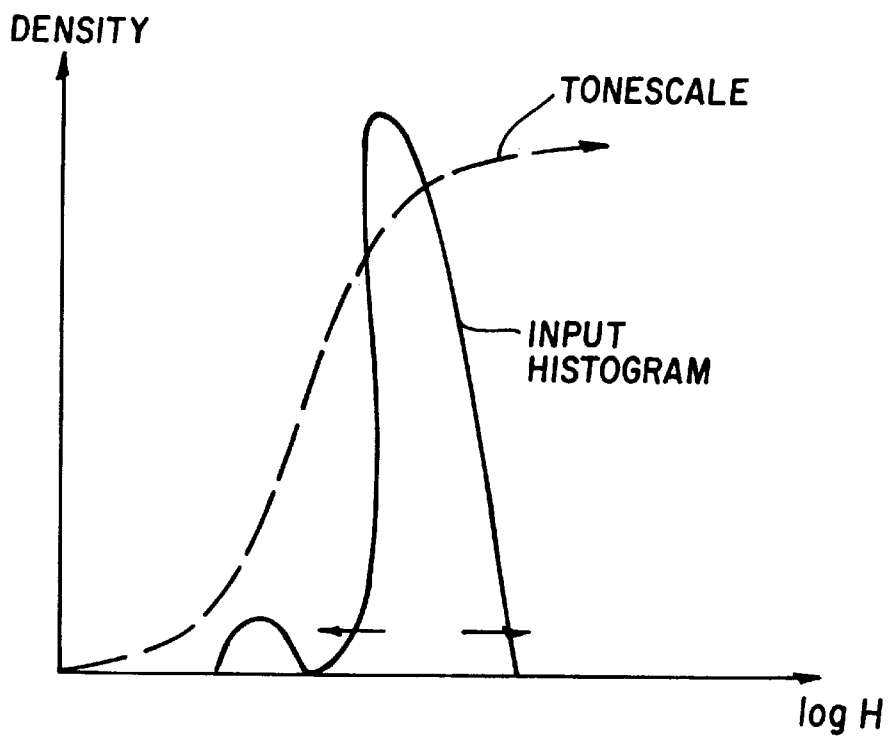

FIG. 3 shows an example of a multiresolution decomposition system. The system includes LPFs 40,42, subtractors 44 and 46, and adder 48. The image sizes of the resolution images are equal to the image size of the original input image, although this need not be the case. The lowpass filters 40,42 can be chosen to meet some desired objective, such as separating noise from edges. In our present system, the filter kernels are chosen to be square arrays of ones. If no processing is performed, the output image is exactly the input image.

FIG. 4 shows some uses of dynamic range compression and expansion. The dynamic range modification can be linear or non linear. Linear dynamic range modification is performed by multiplying the lowpass image by a constant, and then shifting the result to the mean of the original image. The shifting can also be done to vary the zero-crossing of the dynamic range compression and to shift the brightness of the displayed image to a satisfying level. In FIGS. 4a–4b, the dynamic range of the original is compressed by multiplying the data by a constant less than unity and then shifting the result so that its mean is equal to the mean of the original data. The effect is to enable data at the two extremes that otherwise would have gotten clipped to the same density output level by the tonescale to be mapped by the linear portion of the curve. By mapping the two extremes to the linear portion of the curve, the local contrast in some regions can increase. In FIGS. 4c–4d, the dynamic range is expanded by multiplying the data by a constant greater than unity and shifting the resulting data so that its mean is equal to the mean of the original data. The effect is to increase the global contrast of the displayed image.

Figure 5A:
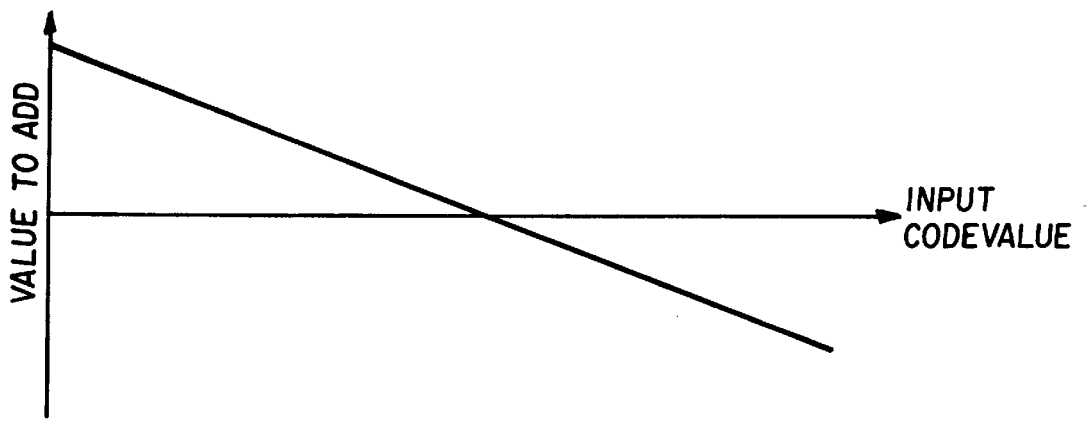
FIGS. 5a–5b are graphical views of linear and nonlinear dynamic range compression.
Figure 5B:
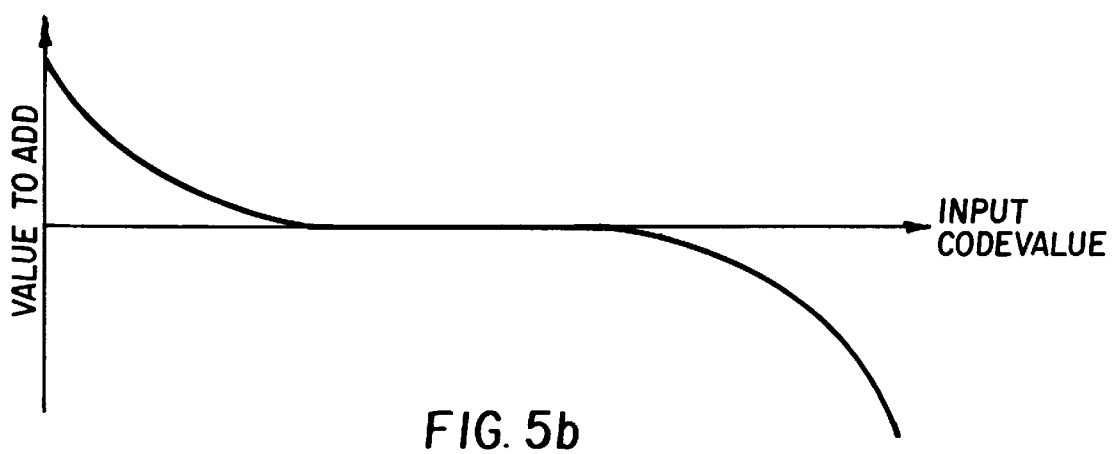

FIGS. 5a–5b shows some examples of curves that can be used for dynamic range compression. The top curve (FIG. 5a) is linear compression, and the bottom curve (FIG. 5b) is nonlinear compression.

Figure 6A:
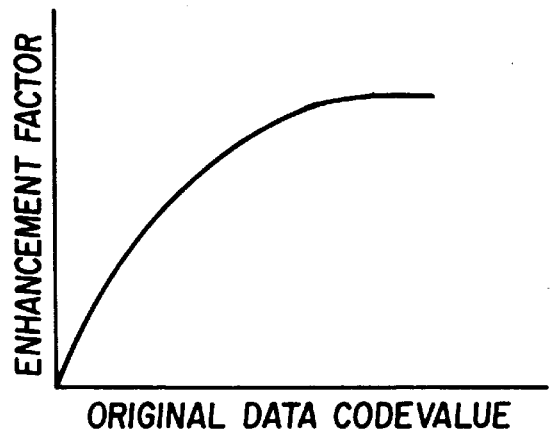
FIGS. 6a–6c are graphical views of enhancement functions.
Figure 6B:
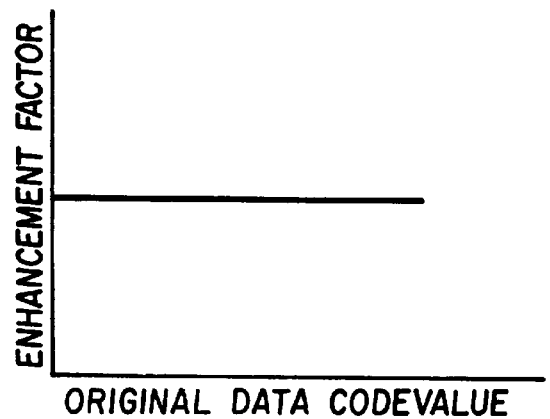
Figure 6C:
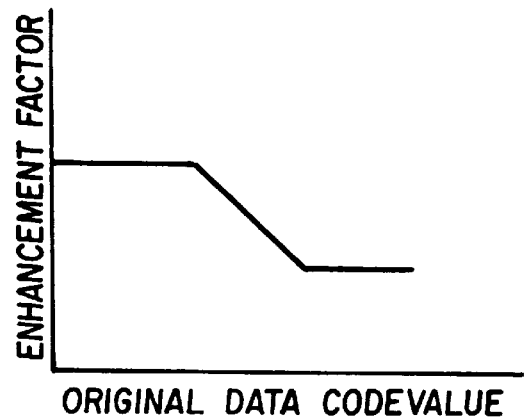

FIGS. 6a–6c shows the curves used to sharpen the images. The top curve (FIG. 6a) represents an enhancement curve based on a code value-based noise estimation algorithm. The algorithm is described further by Snyder. The curve is generated as follows:

1. The data range is partitioned into sub-intervals of equal length;
2. Edge detection is performed on the data, yielding an array of gradient values;
3. Gradient histograms are computed for each sub-interval;
4. The gradient histograms are thresholded to differentiate gradients associated with noise from gradients associated with edges;
5. If a pixel is determined to not be an edge, its value is averaged with surrounding pixel values to determine an approximate noise free value;
6. If a pixel is determined to not be an edge, a noise measure is determined by determining the magnitude of the difference between the pixel and its approximate noise free value. For spatial noise estimation, these noise measures are sufficient to determine appropriate amounts of enhancement;

7. The standard deviation of the noise measures in each subinterval are computed;
8. The standard deviations are used generate the parameters to an exponential model of the noise distribution.

From the exponential curve generated by the noise estimation algorithm, appropriate weights to the high frequency images are generated.

The middle curve (FIG. 6b) demonstrates the profile of enhancement for regular unsharp masking. The bottom curve (FIG. 6c) represents a curve generated for anatomically selective enhancement. The curve was generated by the algorithm described by Sezan.

Figure 7:
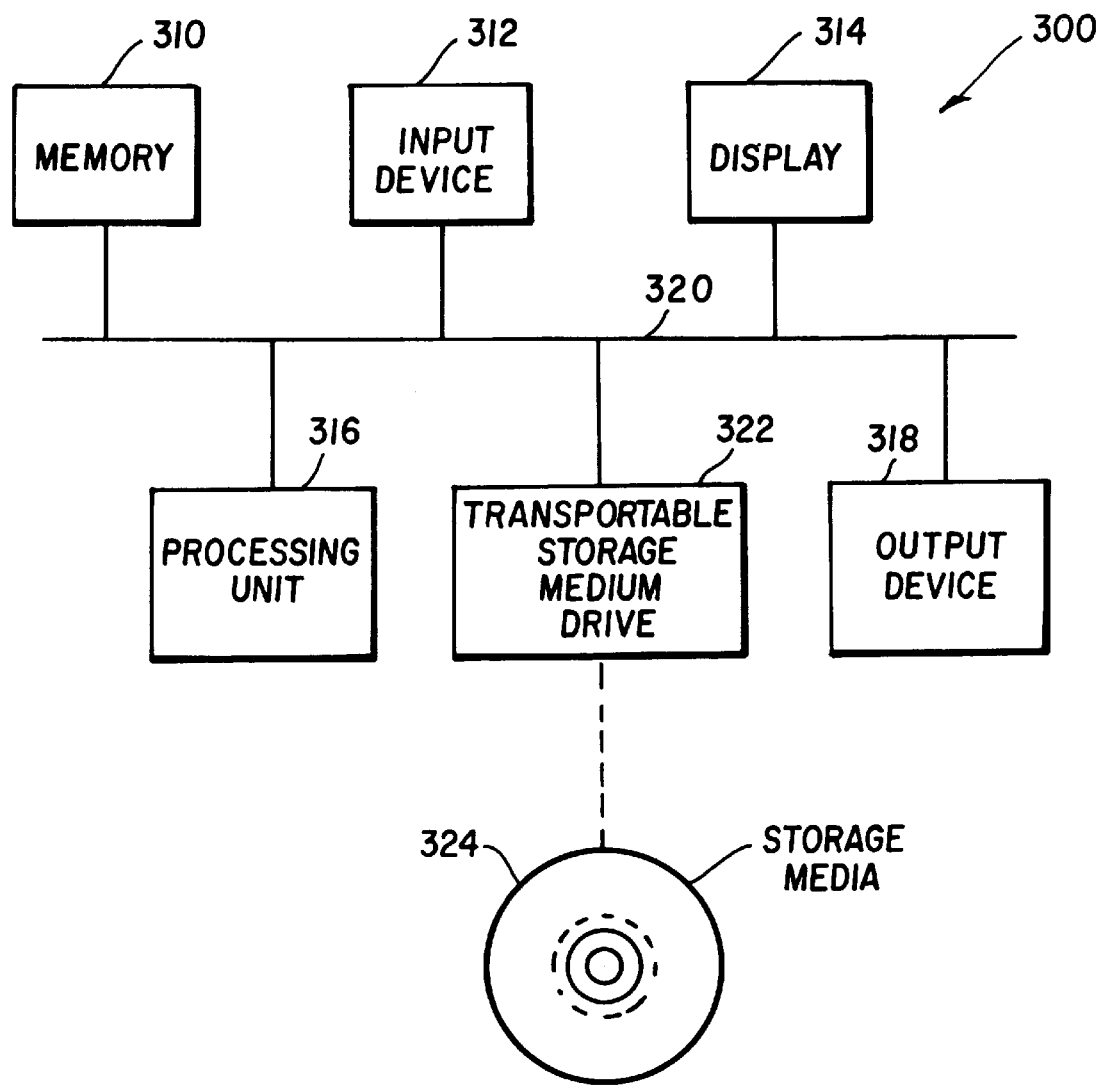
FIG. 7 is a block diagram of an image enhancement system for carrying out the present invention.

The digital image is processed in image enhancement system 32 (FIG. 2) according to the method of the present invention. System 32 can take the form of a digital computer, such as illustrated in FIG. 7. In such case, one or more of the steps of said method can be carried out using software routines. Image processor can also include hardware or firmware for carrying out one or more of the method steps. Thus, the steps of the method of the invention can be carried out using software, firmware, and hardware, either alone or in any preferable combination.

As shown in FIG. 7, a digital computer 300 includes a memory 310 for storing digital images, application programs, operating system, etc. Memory 310 can include mass memory (such as a hard magnetic disc or CD ROM), and fast memory (such as RAM). Computer 300 also includes input device 312 (such as a keyboard, mouse, touch screen), display 314 (CRT monitor, LCD), central processing unit 316 (microprocessor), output device 318 (thermal printer, dot matrix printer, laser printer, ink jet printer). Components 310, 312, 314, 316, 1n3 318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

The utility of the enhancement algorithm has been demonstrated. Noise-estimation based enhancement was tested by generating a series of enhanced images with a certain set of parameters and comparing them to images processed with a regular unsharp masking program with a comparable set of parameters. The images from the noise estimation based enhancement algorithm were clearly less noisy than the images from the regular algorithm, although the sharpness of the edges were equal. The anatomically selective enhancement algorithm is currently in a Kodak product, and has repeatedly been demonstrated to work. The utility of the present invention was further tested by generating a series of images with the method and asking experienced observers to evaluate them. The response to date has been positive.

Parts List

10 LPF
12 subtractor
14,16 circuit
18 adder
20 shifter
22 look-up-table
30 image acquisition unit
32 image enhancement system
34 display monitor
40,42 LPF
44,46 subtractors
48 adder
300 digital computer
310 memory
312 input device
314 display
316 central processing unit
318 output device
320 control/data bus
322 transportable storage medium drive
324 transportable storage media

What is claimed is:

1. A method for compressing the dynamic range of a digital radiographic image comprising the steps of:

providing an original digital radiographic image;

processing said original digital radiographic image with an unsharp masking technique to produce a low frequency digital radiographic image having low frequency components;

subtracting said low frequency digital radiographic image from said original digital radiographic image to produce a high frequency digital radiographic image;

multiplying said low frequency image by a first gain factor and said high frequency image by a second gain factor to produce respective modified low and high frequency images;

combining said modified low and high frequency images with a mid-range image to produce an output digital image; and passing said output digital image through a look-up table to render an image with code values that represent optical density of a printed or displayed rendering of the image.

2. The method of claim 1 wherein said providing step provides a projection digital radiographic image produced by computed radiography or direct digital radiography.

3. The method of claim 1 wherein said processing step includes convolving the exposure code value data E(i,j) of said original image with a kernel whose dimension is more than 1/40th but less than 1/10th, the size of the short dimension of the image matrix to produce an image $E_{low}(i,j)$ which is an unsharp version of said original image.

4. The method of claim 3 wherein said subtracting step is expressed as:

$$E_{high}(i,j)=E(i,j)-E_{low}(i,j).$$

5. The method of claim 4 wherein in said multiplying step said first gain factor is greater than 0 but less than 1, said second gain factor β is greater than 1, and in said combining step, $$E'(i,j)=\alpha E_{low}(i,j)+(1-\alpha)E_{mid}+\beta E_{high}(i,j)$$

where E'(i,j) is the output digital image; and

Emid is the exposure code value corresponding to the density in the image that remains invariant.

6. A computer storage product comprising:

a digital storage device containing data to be read and used by a computer, said data including a computer program for carrying out a method for compressing the dynamic range of a digital radiographic image comprising the steps of:

providing an original digital radiographic image;

processing said original digital radiographic image with an unsharp masking technique to produce a low frequency digital radiographic image having low frequency components;

subtracting said low frequency digital radiographic image from said original digital radiographic image to produce a high frequency digital radiographic image;

multiplying said low frequency image by a first gain factor and said high frequency image by a second gain factor to produce respective modified low and high frequency images;

combining said modified low and high frequency images with a mid-range image to produce an output digital image; and passing said output digital image through a look-up table to render an image with code values that represent optical density of a printed or displayed rendering of the image.

* * * * *